JAMES MALLON & HENRY VON PHUL, Jr.
Improvement in Cultivators.
No. 121,794.          Patented Dec. 12, 1871.
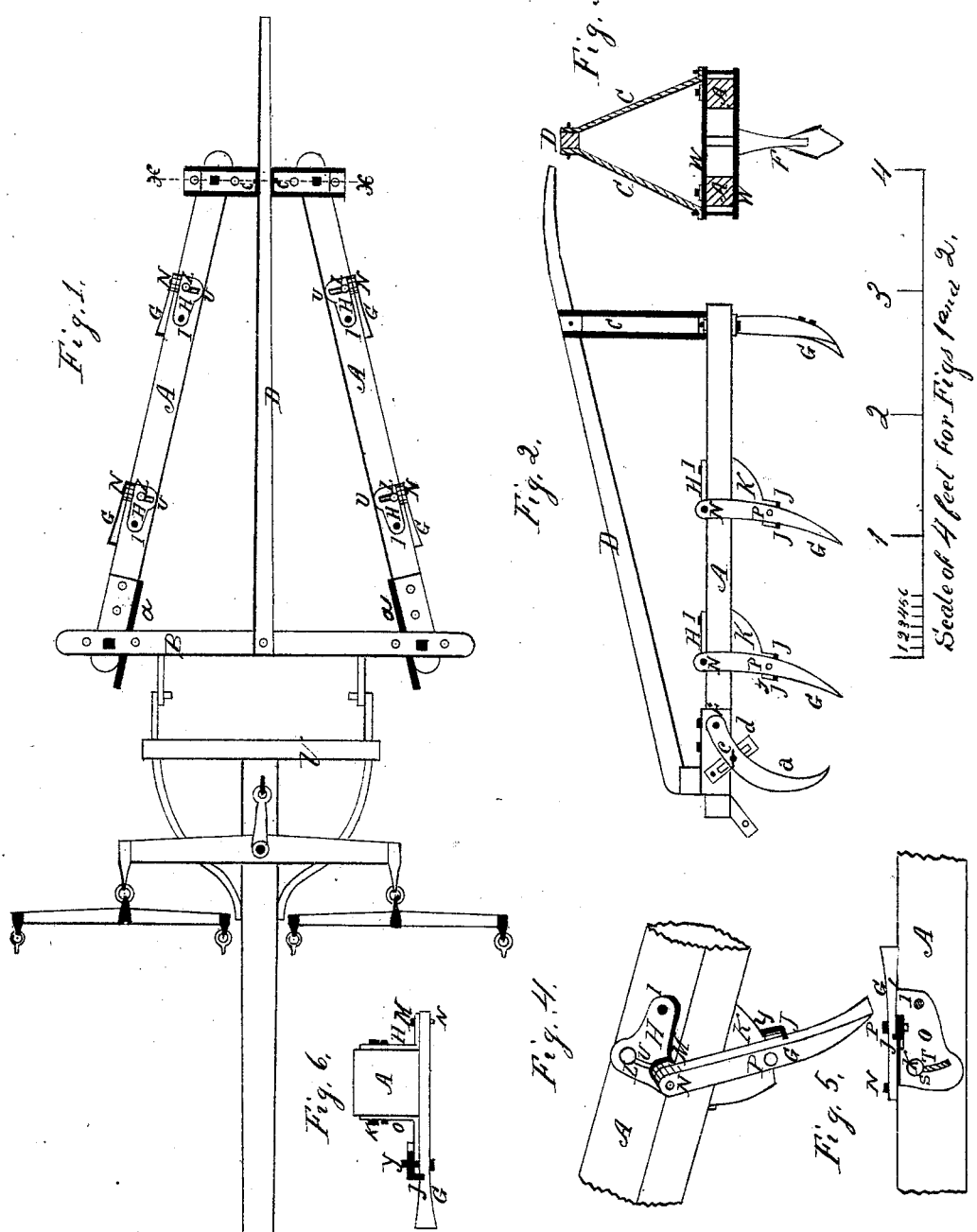

121,794

UNITED STATES PATENT OFFICE

JAMES MALLON AND HENRY VON PHUL, JR., OF HOLLY WOOD, LOUISIANA.

IMPROVEMENT IN CULTIVATORS.

Specification forming part of Letters Patent No. 121,794, dated December 12, 1871.

*To all whom it may concern:*

Be it known that we, JAMES MALLON and HENRY VON PHUL, Jr., of Holly Wood, in the parish of East Baton Rouge and State of Louisiana, have invented an Improved Cultivator, of which the following is a specification:

The present invention relates to an improved cultivator, which may be used to till any kind of crop planted in rows, but which is designed more especially to cultivate cane and cotton; and its nature consists in the novel means for attaching and adjusting the shovels combined and arranged with the cultivator, as hereinafter described and shown.

In the drawing, Figure 1 is a plan or top view of our improved cultivator with the draft attachment complete; Fig. 2, a longitudinal elevation of the same with draft attachment removed; Fig. 3, a section thereof taken on line $x$, Fig. 1; Fig. 4, an enlarged perspective view of the shovel attachment; Fig. 5, an inverted view of the beam and shovel attachment; Fig. 6, a sectional elevation of the beam and shovel attachment looking from the rear toward the front of the cultivator.

A A represent the beams; B, the front cross-bar, and W W the rear bars of the cultivator. The bars W W are bolted fast to the rear end of the beams A, and support a truss, C C, which sustains the rear end of a handle, D, by means of which the cultivator is guided, the forward end of the handle being fastened to the cross-bar B. The bars W W also support a rear or center shovel, F, Fig. 3. The shovel attachment consists of an upper plate, H, which is pivoted to the top of beam A at I, and slotted out at U, so that when a slot-screw, L, is loosened the plate H can be swung on its pivot and adjust the shovel G to or from the beam. This movement will also change the pitch of the shovels relative to a line drawn transversely with the rows; consequently earth can be thrown to or from the row, as the case may require. The plate H has an upwardly-projecting part, M, to which the standard of the shovel G is pivoted at N. The under side of beam A is provided with a plate, O, pivoted to the beam A at I, similarly to the plate H, and it has the same form of slot T and set-screw S, so that when one plate is swung out the other plate will have a simultaneous movement. The lower plate O has projecting downward from it a flange, K, on which a clutch, y, slides. This clutch is provided with projecting nibs J bearing against the shank of the shovel G, and is held in place by a bolt and nut, P. The object of the flange and clutch is to give the shovel G more or less forward pitch. To make the adjustment the screw-bolt P must be loosened, and the shank of shovel swung backward or forward on the pivot N, as required. The device for regulating the depth which the shovels are to run in the ground consists of two curved runners, a, which are pivoted to the beams A at f, and arranged to be adjusted by means of set-screws c passing through slotted plate d, which are fastened to the beams A, as shown at Fig. 2.

Having thus described our invention, what we claim, and desire to secure, is—

The combination of the slotted plates H O, clutch y, flange K, and standard of shovel G, as set forth.

JAMES MALLON.
HENRY VON PHUL, JR.

Witnesses:
JAMES H. STROD,
SOSTHENE HEBERT. (43)